June 25, 1940. A. E. HARNSBERGER Re. 21,487
PROCESS FOR TREATING OIL GAS
Original Filed May 8, 1929
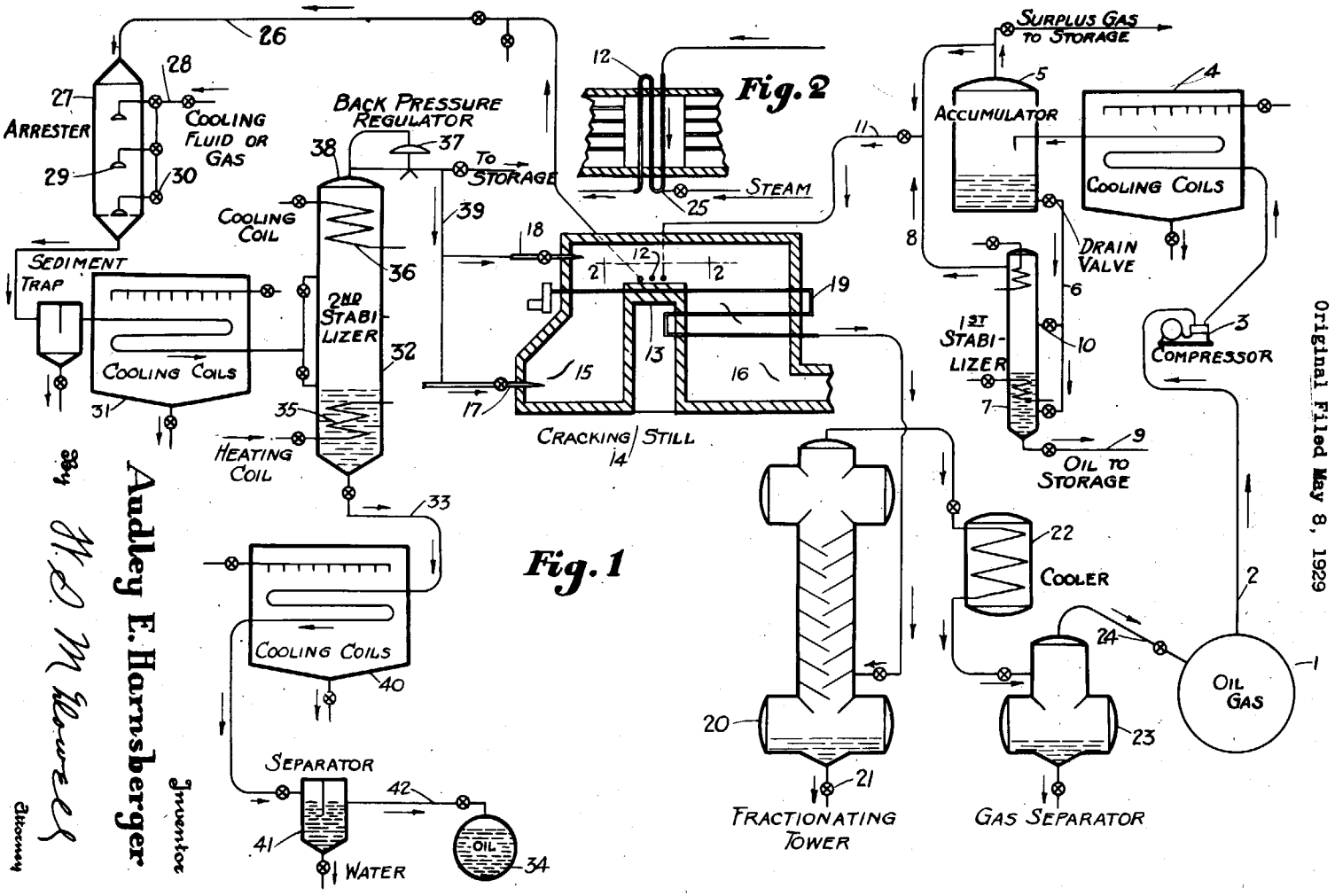
Inventor
Audley E. Harnsberger
By W. D. M. Howell
Attorney Reissued June 25, 1940

Re. 21,487

UNITED STATES PATENT OFFICE 21,487

PROCESS FOR TREATING AN OIL GAS

Audley E. Harnsberger, Winnetka, Ill., assignor to The Pure Oil Company, Chicago, Ill., a corporation of Ohio Original No. 1,900,057, dated March 7, 1933, Serial No. 361,447, May 8, 1929. Application for reissue April 17, 1934, Serial No. 721,061

17 Claims. (Cl. 196—10)

This invention relates to the pyrogenesis of hydrocarbons and, with respect to its more specific aspects, the invention has for an object the provision of a system adapted for the cracking of hydrocarbon gases for the purpose of producing from such gases, aromatic-containing liquid hydrocarbons having substantially the boiling range of gasoline or analogous hydrocarbon motor fuels.

Another object of the invention resides in a system for effecting the molecular decomposition of hydrocarbons wherein the charging stock consists of the so-called "permanent" gas, such as is commonly made in oil cracking processes.

In the operation of cracking hydrocarbons it is customary to employ a charging stock heavier than gasoline. Such a charging stock, for example, may be a gas-oil fraction having a gravity range between 30° and 40° Bé. When such a fraction is passed through a heated cracking zone and subjected to cracking reactions, three products are obtained, namely, a fuel oil fraction that is heavier than the original charging stock and possessing usually a gravity of between 10° and 12° Bé.; second, a gasoline or motor fuel fraction that is lighter than the original charging stock, and which may possess a gravity of approximately 56° Bé.; and, third, a so-called "permanent" gas fraction that is somewhat lighter than the gasoline or motor fuel fraction. The gas fraction is generally produced at a pressure varying from one pound to 50 pounds or higher and, under customary methods of procedure, is compressed to a higher pressure and cooled in order to condense out certain valuable liquefiable fractions which fall into the so-called "casinghead" series of gasoline. This condensate normally is very wild or volatile and is therefore stabilized under pressure to reduce somewhat its volatility and then blended with gasoline or other motor fuel fractions. This operation generally removes the greater part of the isobutane content from the permanent gas.

While this method effects a reduction in the quantity of permanent gas produced from a given cracking operation nevertheless, a very considerable quantity of such gas is formed in relation to the total quantity of condensate obtained from a particular charging stock as a motor fuel, and it is therefore an outstanding object of the present invention to provide a system for treating the so-called "permanent" gas for the purpose of more effectively securing through decomposition or polymerization reactions the total liquefiable content of the hydrocarbons under treatment.

In accordance with the present invention, permanent gas obtained from a cracking operation is passed through a heating zone in order to crack or polymerize the gas into two fractions, one a fraction heavier than the gas, which is partly liquid under ordinary temperatures, and the second a lighter permanent gas. For instance, if the charging materials should comprise a gas having a specific gravity of one, this stock upon cracking will produce a condensate having the approximate boiling range of gasoline, and at the same time make a lighter permanent gas having a specific gravity of, for example, between .55 and .65.

Thus the present invention provides a system for the treatment of fixed gases, obtained from cracking stills, wherein the fixed gases are passed under pressure through a heating zone and while in said zone subjected to temperatures sufficiently high to effect molecular reactions which produce a liquefiable fraction and a light gas fraction, the liquefiable fraction being suitable for use as a motor fuel.

For a further understanding of the invention reference is to be had to the following description and the accompanying drawing wherein:

Figure 1 is a view disclosing diagrammatically the apparatus used in carrying out the features of the present invention, and Figure 2 is a horizontal sectional view on the line 2—2 of Figure 1.

Referring more particularly to the drawing, a source of oil gas is shown which in this instance consists of a vessel 1 in which is received the so-called "fixed" or "permanent" gas obtained from a cracking system. In the vessel 1 any suitable pressure may obtain on the gas, and this pressure may vary between 1 and 150 pounds, depending upon the particular kind of cracking system in conjunction with which the present invention is used. This gas is passed by a line 2 to a compressor 3 in which the gas is compressed to a pressure of approximately 175 pounds per square inch. From the outlet side of the compressor the compressed gas passes through a cooling coil 4 and thence into an accumulator 5. A liquid condensate collects in the bottom of the accumulator and is conducted by a pipe line 6 to a stabilizer 7 under full accumulator pressure. Within the stabilizer the more volatile fractions are removed from the liquid condensate, the said volatile or vaporous fractions passing off from the stabilizer by way of a pipe line 8, while the liquid condensate, which accumulates in the bottom of the stabilizer, is removed by way of a pipe line 9 to a storage vessel. Reflux oil may be introduced into the upper portion of the stabilizer by a branch line 10 connected with the pipe line 6. All of these lines may be provided with suitable valves for governing fluid flow therethrough.

The gas, which is released from the tops of the accumulator 5 and the stabilizer 7, is conducted by way of a pipe line 11 to a heating and cracking coil 12 located, in this instance, above the bridge wall 13 of a furnace 14. This furnace is formed to include the customary setting which is divided internally by the bridge wall 13 into combustion and tube chambers 15 and 16 respectively. A burner 17 is located in the bottom of the combustion chamber 15 and preferably a similar burner 18 is located in the top of the furnace to more effectively heat, if necessary, the coil 12. This cracking coil preferably consists of approximately five lengths of chrome-nickel tubing, which alloy possesses characteristics that will enable the tubing to operate indefinitely at the operating pressure employed up to tube wall temperatures of 1500° F.

Also arranged in the furnace are tubes 19 through which the original charging stock is passed. While traveling through the tubes 19 in vaporous form the charging stock is preferably heated to a temperature varying between 1000° F. and 1250° F. and thereby subjected to molecular decomposition. From the tubes 19 the charging stock passes into a fractionating column 20, the liquid condensate being removed from the bottom of the column 20 by way of the outlet 21, while the vaporous fraction passes overhead and thence through a condenser 22 and finally to a gas separator 23, the liquids being removed from the bottom of the separator while the gases pass from the top of the separator through a pipe line 24 to the vessel 1. This permits the gases developed by the cracking reactions which take place in the tubes 19 to be employed as a charging stock for the coil 12.

At the end of the first pass of tubes comprising the coil 12, I may introduce a small amount of steam into the gas cracking coil, as indicated at 25. At this point the temperature of the gas passing through the coil 12 will be above the condensing temperature of the steam within the pressure range specified. Steam need not be supplied to the coil 12 continuously but may be introduced periodically in order to remove coke deposits within the tubes 12. It is also possible to introduce steam and a small amount of air into the coil 12 to burn out carbon deposits. At such times the exit of the coil 12 is piped to a safe point in the atmosphere by means of the pipe lines and valves disclosed. Also, one or more of the tubes comprising the coil 12 may contain cores of catalytic materials, such as iron oxide or nickel.

The gases passing through the coil 12 are usually heated to a temperature of approximately 1300° to 1400° F., but these values may be varied somewhat in order to secure desired results. At these temperatures the gases are transformed into aromatic hydrocarbons. Following passage through the cracking zone formed by the coil 12 the vapors are then conducted by means of the pipe line 26 to an arrester 27 wherein the temperature of the vapors is suddenly reduced to below 600° F. by means of a cooling fluid, such as water or oil or gas introduced in spray or finely divided form into the arrester and into intimate contact with the heated vapors by means of a pipe line 28 provided with nozzles 29. The nozzles 29 spray the cold oil or other cooling liquid into intimate physical contact with the heated oil vapor obtained from the cracking coil 12, shock-chilling said vapors to arrest further cracking reactions. Control of the time of the reaction can be obtained by introducing the fluid at any one of several points within the arrester by the manipulation of the valves 30 governing the flow of the cooling fluid to the nozzles 29. Final cooling may be provided by an ordinary cooling coil 31 using water or, in certain instances, the cooling coil 31 may be resorted to for effecting completely the arresting of the conversion reactions of the vapors discharged from the coil 12, along with final cooling to atmospheric temperature.

The liquid and gas are then introduced into a stabilizing column or fractionating tower 32 at any convenient point, and the condensate rectified to proper specifications and drained from the bottom of the tower through a line 33, whence it is conducted to a storage tank 34 as a motor fuel condensate. In the bottom of the stabilizer 32 there is located a heating coil 35, using steam or hot oil for reboiling, and on the top of the column there may be located a cooling coil 36, using cold water or some other cooling medium for the purpose of controlling the outlet temperature of the gases or vapors issuing from the top of the stabilizer. Thus a temperature gradient is maintained from top to bottom of the stabilizer. Pressure on the entire system is controlled by a back pressure regulator 37, located in the outlet 38 of the stabilizer, and preferably this regulator is set to maintain a pressure of approximately 150 pounds per square inch within the system. From the regulator the gas may pass through a line 39 and may be led to the burners 17 and 18 for utilization as a fuel, or may be conducted to other suitable points of storage. The fluid reboiled by the coil 35 may be cooled by a cooler 40, passed through a separator 41 and then led by way of a line 42 to storage.

In view of the foregoing it will be seen that the present invention provides a system for cracking or treating converter gas for the purpose of obtaining from such gas or other pressure-cracking operation a maximum quantity of its liquefiable constituents. I am aware of the fact that it is customary to compress converted gases of this type to secure as far as possible the liquid content, but it will be observed that the present invention goes beyond this customary step by passing the gases, which remain after compression, to a highly heated cracking still, whereby such gases are subjected to violent molecular reactions to produce chemically (either by cracking or polymerization) liquefiable compounds suitable as motor fuels. The invention has particular application to vapor phase methods of cracking oils, in which systems large quantities of fixed gas are liberated. Through the employment of the present invention a very large percentage of this fixed gas is transferred into liquid hydrocarbons which have a much higher commercial value than the gaseous hydrocarbons, which latter, in many cases, are used merely for fuel purposes at the refinery.

The stabilizer 7 may be provided with reboiling and refluxing coils to correspond with those provided in the second stabilizing column 32. Preferably a sediment trap is disposed in the pipe line between the conversion arrester 27 and the cooling coil 31 to act as a trap for the collection of sediment, such as carbon or coke formed in the cooling of the converted oils. The cooling fluid used in the arrester may be in the form of a cool gas obtained from any suitable source, rather than a liquid, the gaseous cooling medium being utilized in some instances for the purpose of reducing carbon formation.

What is claimed is:

1. The method of converting hydrocarbons, which consists in passing vaporized hydrocarbons of high boiling range through a heated converting zone possessing relatively high and low temperature regions, heating said hydrocarbons during their passage through said zone to desired converting temperatures to effect molecular decomposition of such hydrocarbons while in the vapor phase and at temperatures of the order of 1000° F. into hydrocarbons of lower boiling range, removing the converted hydrocarbons from said zone and condensing the lighter compounds thereof, removing from the oils comprising such lighter compounds the normally incondensible gases formed in the converting zone, returning a portion, at least, of said gases for re-passage through the high temperature region only of the aforesaid converting zone, whereby to subject said gases to converting temperatures requisite to produce therefrom reaction products consisting of compounds of higher boiling range than said gases and accompanying quantities of lighter gases, separating said lighter gases from the high boiling compounds, and separately collecting and condensing the high boiling compounds.

2. The method of converting hydrocarbons which consists in passing high boiling range hydrocarbons in a vaporized state through a heated converting zone possessing relatively high and low temperature regions, heating said vaporized hydrocarbons during their passage through said zone to a converting temperature of the order of 1000° F., removing the converted hydrocarbons from said zone and separating the high and low boiling fractions thereof, separating from the hydrocarbons comprising said lighter fractions the incondensible gases formed in the converting zone, returning a portion, at least, of said gases for passage through the high temperature region only of said converting zone without commingling said gases with the higher boiling hydrocarbons passing through said zone and under increased pressure, whereby to subject said gases to converting temperatures of the order of 1300° F. and pressures of the order of 150 pounds per square inch to produce therefrom reaction products consisting of compounds of higher boiling range than said gases and accompanying quantities of lighter gases, separating said lighter gases from the high boiling compounds, and separately collecting and condensing the high boiling compounds.

3. The method as specified in claim 1 in connection with the step of introducing super-heated steam into the gases passing through the high temperature region of the converting zone.

4. The method as specified in claim 1 in connection with the step of shock chilling the products formed by the passage of the gases through the high temperature region of the converting zone to sharply arrest conversion reactions in said products immediately upon their discharge from said zone.

5. The method as defined in claim 2 in combination with the step of maintaining the gases during their passage through the high temperature region of the converting zone in contact with a metallic catalyst.

6. The method of converting hydrocarbons, which consists in passing a confined moving stream of high boiling range hydrocarbons through a heated converting zone, heating said zone to produce therein relatively high and low temperature regions, controlling the application of heat to the hydrocarbons, during their passage through said zone to raise the same to converting temperatures varying between 1000° F. and 1200° F. while said hydrocarbons are maintained in a vaporized condition, removing the converted hydrocarbons from said zone and condensing the lighter compounds thereof to remove from said compounds incondensible gases formed in the converting zone, returning a portion, at least, of said gases for passage through the high temperature region only of the aforesaid converting zone without commingling said gases with the high boiling hydrocarbons initially passing through said zone, heating said gases during their passage through the high temperature region of the converting zone to converting temperatures of the order of approximately 1300° to 1400° F. while maintaining the gases under a pressure of several atmospheres, whereby to produce from said gases hydrocarbon compounds having substantially the boiling range of ordinary gasoline, and separately collecting and condensing the said latter high boiling compounds.

7. A method of converting hydrocarbon gas into liquefiable aromatic hydrocarbons which comprises subjecting the gas to conversion conditions of temperature and pressure in a heating zone, immediately thereafter checking the conversion reaction by introducing a cooling oil into direct and intimate contact with the heated gas, passing the resultant mixture to a stabilizing zone wherein a temperature gradient is maintained from top to bottom to produce a rectifying effect upon the gases and vapors, separating the condensible from the incondensible reaction products in said zone, and separately withdrawing the gases and liquids from the top and bottom respectively of said stabilizing zone.

8. A method of converting hydrocarbon gas into liquefiable hydrocarbons which comprises subjecting the gas to conversion conditions of temperature and pressure in a heating zone, immediately thereafter checking the conversion reaction by introducing a cooling oil into direct and intimate contact with the heated gas, passing the resultant mixture to a stabilizing zone wherein a temperature gradient is maintained from top to bottom to produce a rectifying effect upon the gases and vapors, separating the condensible from the incondensible reaction products in said zone, and separately withdrawing the gases and liquids from the top and bottom respectively of said stabilizing zone.

9. A method of converting hydrocarbon gas into liquefiable hydrocarbons which comprises subjecting the gas to conversion conditions of temperature and pressure in a heating zone, immediately thereafter checking the conversion reaction by introducing a cooling fluid into direct and intimate contact with the heated gas, passing the resultant mixture to a stabilizing zone wherein a temperature gradient is maintained from top to bottom to produce a rectifying effect upon the gases and vapors, separating the condensible from the incondensible reaction products in said zone, and separately withdrawing the gases and liquids from the top and bottom respectively of said stabilizing zone.

10. A method of converting hydrocarbon gas into liquefiable hydrocarbons which comprises subjecting the gas to conversion conditions of temperature and pressure in a heating zone, immediately thereafter checking the conversion reaction by introducing a cooling fluid into direct and intimate contact with the hot conversion products, passing the resultant mixture to a stabilizing zone wherein a temperature gradient is maintained from top to bottom to produce a rectifying effect upon the gases and vapors, separating the condensible from the incondensible reaction products and separately withdrawing the gases and liquids from said stabilizing zone.

11. A method of converting hydrocarbon gas into liquefiable hydrocarbons which comprises subjecting the gas to conversion conditions of temperature and pressure in a heating zone, immediately thereafter checking the conversion reaction by introducing a cooling oil into direct and intimate contact with the hot conversion products, and rectifying the resulting mixture to separate the condensible from the incondensible reaction products.

12. A method of recovering increased yields of low boiling oils from high boiling oils which comprises cracking hydrocarbon oils under conditions whereby to yield a substantial amount of gasoline, fractionating the cracked oil to separate liquids from gases, subjecting the gases to conversion conditions of temperature and pressure whereby to convert a portion of said gases into liquid hydrocarbons, immediately checking the conversions of said gases by direct contact with a cooling fluid and fractionating the mixture to separate the condensible from the incondensible products.

13. A method of recovering increased yields of gasoline fractions from a vapor phase cracking process which comprises vaporizing oil, subjecting the vapors to cracking conditions of temperature and pressure to yield a substantial amount of gasoline, separating the resulting gases from the cracked liquid portion, subjecting said gases to conversion conditions of temperature and pressure to form liquid hydrocarbons boiling within the gasoline range, immediately checking conversion of the gases by direct contact with cooling oil and subjecting the resulting mixture to rectification to separate the condensible from the incondensible products.

14. A method of converting hydrocarbon gas into liquefiable hydrocarbons which comprises subjecting the gas to conversion conditions of temperature and pressure in a heating zone, immediately thereafter checking the conversion reaction by introducing a cool oil into direct and intimate contact with the heated gas, passing the resultant mixture to a stabilizing zone to produce a rectifying effect upon the gases and vapors, separating the condensible from the incondensible reaction products in said zone, and separately withdrawing the gases and liquids from the top and bottom respectively of said stabilizing zone.

15. A process for the conversion of normally gaseous hydrocarbons to normally liquid hydrocarbons which comprises flowing a stream of said gaseous hydrocarbons through a tube under high pressure, heating said stream during passage through said tube to an elevated temperature whereby some of said gaseous hydrocarbons will be converted to liquid hydrocarbons, and adding relatively cool hydrocarbon oil to said stream of gaseous hydrocarbons after said stream has been heated and prior to substantial reduction of said pressure under which said stream is held subsequent to said addition of oil in order to suddenly reduce the temperature thereof sufficiently to arrest the reaction.

16. A process for conversion of normally gaseous hydrocarbons to normally liquid hydrocarbons which comprises flowing a stream of said gaseous hydrocarbons through a tube under superatmospheric pressure, heating said stream during passage through said tube to an elevated temperature suitable for converting gaseous to normally liquid hydrocarbons, maintaining the gases under reaction conditions for a suitable period of time to bring about the desired conversion, and immediately thereafter suddenly chilling the hot reaction products to a temperature sufficiently low to arrest the reaction by adding thereto relatively cool oil, and fractionating the resulting mixture into gas and liquid fractions.

17. Process in accordance with claim 16 in which the gaseous hydrocarbons are obtained from the high temperature cracking of petroleum oils.

AUDLEY E. HARNSBERGER.